United States Patent
Richards et al.

(10) Patent No.: US 9,739,068 B2
(45) Date of Patent: Aug. 22, 2017

(54) CONCRETE CURING BLANKET

(71) Applicant: Ramshorn Corporation, Huntington Beach, CA (US)

(72) Inventors: Randall C. Richards, Fallbrook, CA (US); Gary M. Crowel, Fallbrook, CA (US)

(73) Assignee: Ramshorn Corporation, Huntington Beach, CA (US)

( * ) Notice: Subject to any disclaimer, the term of this patent is extended or adjusted under 35 U.S.C. 154(b) by 213 days.

(21) Appl. No.: 14/709,747

(22) Filed: May 12, 2015

(65) Prior Publication Data

US 2016/0222685 A1    Aug. 4, 2016

Related U.S. Application Data

(60) Provisional application No. 62/110,526, filed on Jan. 31, 2015.

(51) Int. Cl.
*B32B 3/24* (2006.01)
*B32B 5/02* (2006.01)
(Continued)

(52) U.S. Cl.
CPC ............ *E04G 21/246* (2013.01); *B32B 3/266* (2013.01); *B32B 5/02* (2013.01); *B32B 5/022* (2013.01); *B32B 7/12* (2013.01); *B32B 27/12* (2013.01); *B32B 27/308* (2013.01); *B32B 27/32* (2013.01); *B32B 27/365* (2013.01); *B28B 11/245* (2013.01); *B28B 11/247* (2013.01); *B32B 5/16* (2013.01); *B32B 5/26* (2013.01); *B32B 5/30* (2013.01); *B32B 7/04* (2013.01); *B32B 21/02* (2013.01); *B32B 21/10* (2013.01); *B32B 21/12* (2013.01);
(Continued)

(58) Field of Classification Search
None
See application file for complete search history.

(56) References Cited

U.S. PATENT DOCUMENTS 2,298,579 A * 10/1942 Meyer .................... B28B 7/368
                                                                    249/114.1
2,310,391 A *  2/1943 Bender ................... B28B 7/368
                                                                    249/114.1
(Continued)

FOREIGN PATENT DOCUMENTS

CN          2892031 Y  *   4/2007
CN        201333135 Y  *  10/2009
(Continued)

OTHER PUBLICATIONS

English Abstract for JP 61060706 A, Mar. 1986.*
(Continued)

*Primary Examiner* — Jeff Vonch
(74) *Attorney, Agent, or Firm* — Eric Karich; Karich & Associates

(57) ABSTRACT

A concrete curing blanket includes an absorbent sheet having a wicking layer, super absorbent materials, and a tissue layer, which are laminated together to form the absorbent sheet. The absorbent sheet is sized for being spread over a curing concrete slab. A vapor barrier is bonded to the tissue layer of the absorbent sheet to inhibit evaporation from the concrete curing blanket, and includes a plurality of perforations.

6 Claims, 2 Drawing Sheets

(51) Int. Cl.
*B32B 5/16* (2006.01)
*B32B 5/26* (2006.01)
*B32B 5/30* (2006.01)
*B32B 7/12* (2006.01)
*B32B 21/02* (2006.01)
*B32B 21/12* (2006.01)
*B32B 27/12* (2006.01)
*B32B 27/32* (2006.01)
*E04G 21/24* (2006.01)
*B32B 3/26* (2006.01)
*B32B 27/30* (2006.01)
*B32B 27/36* (2006.01)
*B32B 37/12* (2006.01)
*C04B 40/04* (2006.01)
*B28B 11/24* (2006.01)
*B32B 7/04* (2006.01)
*B32B 21/10* (2006.01)

(52) U.S. Cl.
CPC ....... *B32B 37/1207* (2013.01); *B32B 2250/04* (2013.01); *B32B 2262/0253* (2013.01); *B32B 2262/0276* (2013.01); *B32B 2262/04* (2013.01); *B32B 2264/025* (2013.01); *B32B 2307/726* (2013.01); *B32B 2307/7246* (2013.01); *B32B 2317/18* (2013.01); *B32B 2419/00* (2013.01); *C04B 40/04* (2013.01); *Y10S 264/43* (2013.01); *Y10S 425/119* (2013.01); *Y10S 428/913* (2013.01); *Y10T 428/24331* (2015.01); *Y10T 442/674* (2015.04); *Y10T 442/678* (2015.04); *Y10T 442/681* (2015.04); *Y10T 442/699* (2015.04)

(56) References Cited

U.S. PATENT DOCUMENTS

| | | | |
|---|---|---|---|
| 3,528,421 A * | 9/1970 | Roberts | A61F 13/534 5/484 |
| 3,888,256 A * | 6/1975 | Studinger | A61F 13/534 428/479.3 |
| 4,275,105 A * | 6/1981 | Boyd | D04H 1/60 428/198 |
| 4,338,371 A * | 7/1982 | Dawn | A61F 5/4401 442/373 |
| 4,423,694 A * | 1/1984 | Senneville | B32B 5/24 112/405 |
| 4,485,137 A | 11/1984 | White | |
| 4,578,068 A * | 3/1986 | Kramer | A61F 13/534 428/152 |
| 4,900,377 A | 2/1990 | Redford et al. | |
| 5,021,050 A * | 6/1991 | Iskra | A61F 13/53713 604/368 |
| 5,143,780 A * | 9/1992 | Balassa | A01N 25/10 106/731 |
| 5,236,427 A * | 8/1993 | Hamajima | A61F 13/534 604/358 |
| 5,271,987 A * | 12/1993 | Iskra | A61F 13/515 428/192 |
| 5,676,660 A * | 10/1997 | Mukaida | A61F 13/53 604/367 |
| H001698 H * | 11/1997 | Lloyd | A61F 13/15203 604/358 |
| 5,743,895 A | 4/1998 | Reiss | |
| 5,763,331 A * | 6/1998 | Demhartner | A61F 13/534 442/393 |
| 5,780,367 A * | 7/1998 | Handwerker | B32B 27/12 442/228 |
| 5,788,684 A * | 8/1998 | Abuto | A61F 13/532 604/358 |
| 5,843,554 A * | 12/1998 | Katz | B32B 27/12 428/192 |
| 5,849,816 A | 12/1998 | Suskind | |
| 5,866,242 A * | 2/1999 | Tan | A61F 13/15203 428/219 |
| 5,873,963 A * | 2/1999 | Trombetta | A61F 13/15626 156/148 |
| 5,877,097 A | 3/1999 | West | |
| 5,919,178 A * | 7/1999 | Widlund | A61F 13/15658 156/276 |
| 6,329,565 B1 * | 12/2001 | Dutkiewicz | A61F 13/5323 442/334 |
| 6,420,626 B1 * | 7/2002 | Erspamer | A61F 13/15617 428/131 |
| 6,485,813 B1 * | 11/2002 | Koslow | A61F 13/15658 428/198 |
| 7,572,525 B2 | 8/2009 | McDonald | |
| 2002/0032424 A1 * | 3/2002 | Nurmi | A61F 13/53 604/378 |
| 2002/0115969 A1 * | 8/2002 | Maeda | A61F 13/15658 604/368 |
| 2002/0133131 A1 * | 9/2002 | Rangachari | A61F 13/15203 604/370 |
| 2002/0176964 A1 * | 11/2002 | Koslow | A61F 13/532 428/171 |
| 2003/0130633 A1 * | 7/2003 | Graef | A61F 13/531 604/365 |
| 2003/0135178 A1 * | 7/2003 | Hansen | A61F 13/535 604/368 |
| 2005/0042957 A1 * | 2/2005 | McDonald | B32B 5/08 442/59 |
| 2005/0054256 A1 * | 3/2005 | Klein | A61F 13/15658 442/382 |
| 2005/0214507 A1 * | 9/2005 | McDonald | B28B 11/245 428/138 |
| 2006/0019064 A1 * | 1/2006 | McDonald | B28B 11/245 428/134 |
| 2006/0137530 A1 * | 6/2006 | Yeager | B01D 53/261 96/154 |
| 2007/0077841 A1 * | 4/2007 | Zoch | A61F 13/531 442/340 |
| 2007/0118087 A1 * | 5/2007 | Flohr | A61F 13/5376 604/372 |
| 2008/0044607 A1 * | 2/2008 | Menday | A61F 13/15 428/36.2 |
| 2008/0167634 A1 * | 7/2008 | Kouta | A61F 13/53409 604/367 |
| 2008/0172017 A1 * | 7/2008 | Carlucci | A61F 13/15203 604/368 |
| 2008/0258341 A1 * | 10/2008 | Parkes | B28B 11/245 264/299 |
| 2009/0133446 A1 * | 5/2009 | Burrow | A61F 13/537 66/176 |
| 2009/0148596 A1 * | 6/2009 | Carroll | B32B 27/32 427/154 |
| 2009/0169849 A1 * | 7/2009 | Bliton | B32B 7/14 428/219 |
| 2010/0025886 A1 | 2/2010 | Carroll | |
| 2010/0038818 A1 * | 2/2010 | McDonald | B32B 5/08 264/232 |
| 2012/0077007 A1 * | 3/2012 | McDonald | B28B 11/245 428/220 |
| 2012/0308780 A1 * | 12/2012 | Rottger | A61F 13/15658 428/172 |
| 2015/0065974 A1 * | 3/2015 | Michiels | A61F 13/534 604/367 |
| 2015/0320617 A1 * | 11/2015 | Ducker | A61F 13/534 604/366 |
| 2016/0040337 A1 * | 2/2016 | Dutkiewicz | D04H 1/559 428/172 |

FOREIGN PATENT DOCUMENTS

| | | | | |
|---|---|---|---|---|
| DE | 19737434 A1 * | 2/1999 | | A43B 3/0084 |
| EP | 1078616 A2 * | 2/2001 | | A61F 13/534 |
| EP | 1243243 A2 * | 9/2002 | | A61G 17/04 |
| FR | 2945058 A1 * | 11/2010 | | B32B 3/08 |
| GB | 2433884 A * | 7/2007 | | A47C 27/006 |

(56) References Cited

FOREIGN PATENT DOCUMENTS

| JP | 59217868 A | * | 12/1984 | |
|---|---|---|---|---|
| JP | 61060706 A | * | 3/1986 | |
| JP | 61100527 U | * | 6/1986 | |
| JP | 63021267 A | * | 1/1988 | |
| JP | 02128071 A | * | 5/1990 | |
| JP | 04198075 A | * | 7/1992 | |
| JP | 05331775 A | * | 12/1993 | |
| JP | 06212799 A | * | 8/1994 | |
| JP | 06285832 A | * | 10/1994 | |
| JP | 06287085 A | * | 10/1994 | ............ C04B 40/04 |
| JP | 08188486 A | * | 7/1996 | ............ C04B 40/04 |
| JP | 2001048676 A | * | 2/2001 | ............ C04B 40/04 |
| JP | 2005307383 A | * | 11/2005 | |
| JP | 2007046270 A | * | 2/2007 | |
| JP | 2007181662 A | * | 7/2007 | ....... A61F 13/51401 |
| WO | WO 2004016425 A2 | * | 2/2004 | ............ B32B 27/12 |
| WO | WO 2009150984 A1 | * | 12/2009 | ......... A61F 13/4756 |
| WO | WO 2010088478 A2 | * | 8/2010 | ............ A01C 21/00 |

OTHER PUBLICATIONS

Machine Translation of JP 02128071 A, May 1990.*
Machine Translation of JP 05331775 A, Dec. 1993.*
Machine Translation of JP 06212799 A, Aug. 1994.*
Machine Translation of JP 06287085 A, Oct. 1994.*
Machine Translation of WO 2009150984 A1, Dec. 2009.*
Einzmann et al., Tailor-Made Absorbent Cellulose Fibers for Nonwovens, 2005, Lenzinger Berichte, vol. 84, pp. 42-49.*

* cited by examiner

CONCRETE CURING BLANKET

CROSS-REFERENCE TO RELATED APPLICATIONS

This application for a utility patent claims the benefit of U.S. Provisional Application No. 62/110,526, filed Jan. 31, 2015.

BACKGROUND OF THE INVENTION

Field of the Invention

This invention relates generally to a concrete curing blanket, and more particularly to a concrete curing blanket that includes an absorbent sheet that includes a wicking layer, a super absorbent material, and a tissue layer, laminated together, and having a.

Description of Related Art

Concrete strength and durability improves when the concrete is thoroughly hydrated during curing. If the concrete is kept wet for the first 7-10 days after setting, strength and durability thereof is increased 75% over ordinary aging of concrete in dry surface conditions.

To keep concrete hydrated, the concrete industry has come to rely on concrete curing blankets for covering wetted concrete and extending the duration of damp conditions on the curing surface of the concrete. An example of such a concrete curing blanket is disclosed in McDonald, U.S. Pat. No. 7,572,525, which teaches a curing blanket that includes a vapor barrier, and an airlaid layer consisting of a binder material and a natural cellulose bleached fluff pulp fiber derived from wood through Kraft processing.

The prior art teaches the use of concrete curing blankets that include an airlaid layer that includes natural cellulose bleached fluff pulp fiber derived from wood through Kraft processing. However, the prior art does not teach a concrete curing blanket that includes an absorbent sheet that includes a wicking layer, a super absorbent material, and a tissue layer, laminated together, which is covered with a vapor barrier having a plurality of perforations. The present invention fulfills these needs and provides further advantages as described in the following summary.

SUMMARY OF THE INVENTION

The present invention teaches certain benefits in construction and use which give rise to the objectives described below.

The present invention provides a concrete curing blanket that includes an absorbent sheet comprising a wicking layer and a tissue layer with super absorbent materials positioned therebetween. The absorbent sheet is sized for being spread over a curing concrete slab. A vapor barrier is bonded to the tissue layer of the absorbent sheet to inhibit evaporation from the concrete curing blanket.

In one embodiment, the concrete curing blanket is at least 1 meter wide and 5 meters long. In one embodiment, the vapor barrier includes a plurality of perforations.

A primary objective of the present invention is to provide a concrete curing blanket having advantages not taught by the prior art.

Another objective is to provide a concrete curing blanket that includes a combination of a wicking layer, a super absorbent material, and a tissue layer, that are laminated together to form an absorbent sheet.

Another objective is to provide a concrete curing blanket that has both superior wicking capabilities from the wicking layer, and also includes superior water holding capacity due to the inclusion of the super absorbent materials.

Another objective is to provide a concrete curing blanket that is sized and shaped to be spread over concrete, either vertically or horizontally, over a large area of concrete during the curing of the concrete.

Another objective is to provide a concrete curing blanket that has a vapor barrier having a plurality of perforations for maintaining water within the absorbent sheet, while also allowing the absorbent sheet to be soaked during installation, and also re-wetted periodically during the course of the curing process.

A further objective is to provide a concrete curing blanket that is inexpensive to manufacture, easy to use, resistant to tearing, and provides superior hydration for extended periods of time.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a concrete curing blanket 10 that is used for providing hydration to a concrete slab C during the curing process, to provide concrete that has superior strength and durability.

Figure 1:
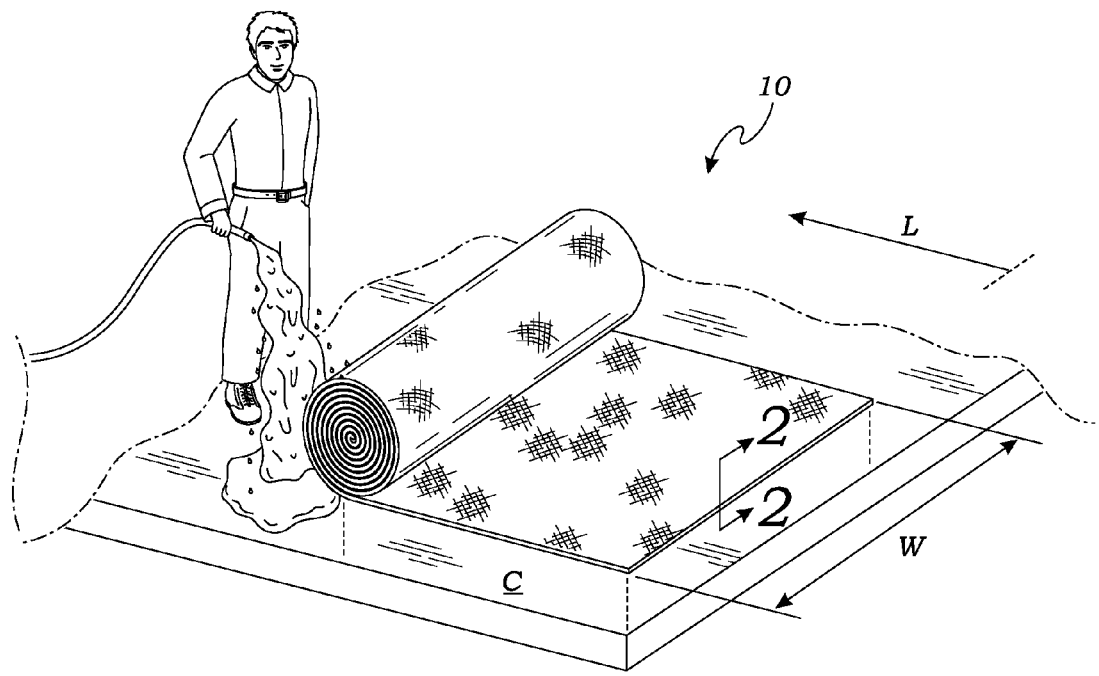
FIG. 1 is a perspective view of a concrete curing blanket according to one embodiment of the present invention, illustrating the concrete curing blanket being positioned on a concrete slab while water is poured onto the concrete slab and into the concrete curing blanket.

FIG. 1 is a perspective view of one embodiment of the concrete curing blanket 10, illustrating the concrete curing blanket 10 being positioned on the concrete slab C. As illustrated in FIG. 1, the concrete curing blanket 10 is manufactured in a roll that is sized for being unrolled over the concrete slab C to effectively cover the concrete slab C. The concrete curing blanket 10 is at least about 1 meter wide, and about 10 meters long. In a typical embodiment, the concrete curing blanket 10 is 1-3 meters wide (in this case about 2.5 meters wide), and about 30-60 (or more) meters long. In alternative embodiments, the measurements may vary according to the needs of the user, but they will be sufficiently large to be useful in covering concrete slabs, which may be of considerable size. As used in this application, the term "about" is hereby defined to include +/−10%.

As illustrated in FIG. 1, before and while the concrete curing blanket 10 is being positioned on the concrete slab C, water is poured in large amounts onto the concrete slab C and into and over the concrete curing blanket 10, so that the concrete slab C remains thoroughly hydrated, and the concrete curing blanket 10 is thoroughly soaked. Once saturated, the concrete curing blanket 10 maintains an optimal amount of water in contact with the surface of the concrete slab C, which optimizes the strength and durability of the concrete when cured.

While one form of concrete slab C is illustrated herein, the term "concrete slab" is hereby defined to include any form of structure that may require this form of hydration, including cement walls, pillars, and other structures known in the art. Indeed, due to the superior water carrying characteristics of the present invention, the concrete curing blanket 10 is particularly useful when used on angled or vertical cement structures, which might otherwise be difficult to keep hydrated.

Figure 2:
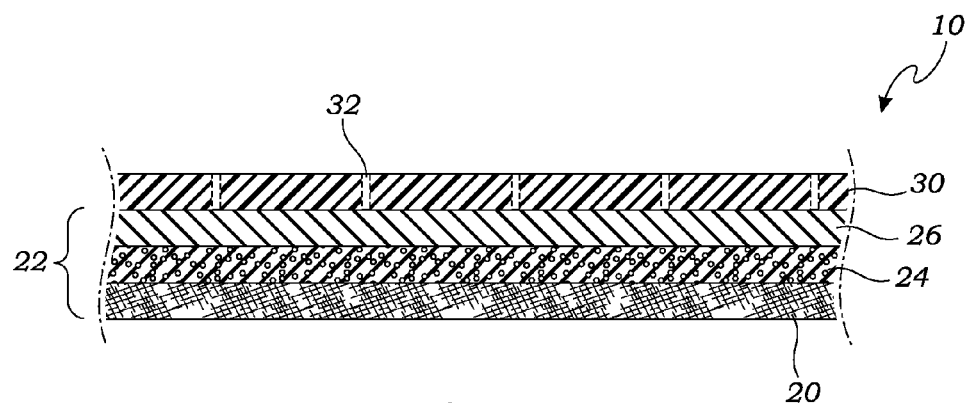
FIG. 2 is a sectional view of the concrete curing blanket taken along line 2-2 in FIG. 1, illustrating the four layers of construction of the concrete curing blanket in the embodiment of FIG. 1.

FIG. 2 is a sectional view of the concrete curing blanket 10 taken along line 2-2 in FIG. 1. FIG. 2 illustrates the four layers of construction of the concrete curing blanket 10 in the embodiment of FIG. 1. As shown in FIG. 2, the concrete curing blanket 10 comprises an absorbent sheet 22 comprising a wicking layer 24 and a tissue layer 26 with super absorbent materials 24 laminated therebetween. The concrete curing blanket 10 further comprises a vapor barrier 30 bonded to the tissue layer 26 of the absorbent sheet 22.

The wicking layer 24 of FIG. 2 is a layer of material that is able to quickly wick up water from the pool of water formed on the concrete slab C (as shown in FIG. 1) as it is rolled onto the concrete slab C, so that the water is quickly and efficiently drawn into the concrete curing blanket 10. Water may also be poured directly onto the roll of the concrete curing blanket 10, to assure that the concrete curing blanket 10 is thoroughly hydrated. In the current embodiment, the wicking layer 24 is a nonwoven fabric, in this case a spunlaced nonwoven fabric comprising viscose. The wicking layer 24 may further comprise a polymer such as polyethylene, polypropylene, and/or polyester, which are useful in the bonding/lamination process, as discussed in greater detail below. In one embodiment, the wicking layer 24 comprises a combination of viscose and polyethylene.

In one embodiment, the wicking layer 24 comprises a cellulose precipitated from an organic solution in which no substitution of the hydroxyl groups takes place and no chemical intermediates are formed (e.g. Lyocell). In alternative embodiments, alternative or equivalent wicking materials may also be used, using formulations that would be known to those skilled in the art, and such alternative or equivalent formulations should be considered within the scope of the present invention.

The super absorbent materials 24 may include super absorbent polymers, super absorbent fibers, or other similar or equivalent materials. As used in the present application, the term "super absorbent polymers" ("SAP") is defined to include polymers that can absorb and retain extremely large amounts of liquid relative to their own mass. Water absorbing SAP, classified as hydrogels, when cross linked, absorb aqueous solutions through hydrogen bonding with water molecules. A SAP's ability to absorb water is a factor of the ionic concentration of the aqueous solution. In deionized and distilled water, a SAP may absorb 500 times its weight (30-60 times its own volume), although this ability drops to only about 10% of this amount when salt is present.

The total absorbency and swelling capacity are controlled by the type of and degree of cross-links used to make the gel. Low density cross-linking have a higher absorbency, which higher cross-link density exhibits lower absorbent capacity and swell, but greater gel strength and firmness.

SAPs are commonly made from the polymerization of acrylic acid bended with sodium hydroxide in the presence of an initiator to form a poly-acrylic acid sodium salt, sometimes referred to as sodium polyacrylate. Other materials known in the art may also be used in this manner. In the present embodiment, the super absorbent materials 24 include a sodium polycarbonate polymer, and may further include additional additives, as discussed in greater detail below.

As shown in FIG. 2, the concrete curing blanket 10 further includes the tissue layer 26, which in the present embodiment is a tissue fabric that is suitable forming a bond between the absorbent sheet 22 and the vapor barrier 30. The tissue layer 26 is a good surface for forming a good, strong, stable bond, and for preventing any bonding agents (glues, cements, bonding agents, etc.) from contaminating the super absorbent materials 24, and interfering with the ability of the super absorbent materials 24 from absorbing water. For purposes of this application, the term "tissue layer" is defined to include tissue fabric, and also any other materials known to those skilled in the art that is able to provide a good bonding attachment between the absorbent sheet and the vapor barrier.

The vapor barrier 30 of FIG. 2 is a film comprising polyethylene or polypropylene or other material that is substantially vapor impervious, to prevent dehydration of the concrete curing blanket 10. The vapor barrier 30 may include perforations 32 so that water may be added from the top of the concrete curing blanket 10, so long as the perforations 32 are not large enough to enable excessive drying of the concrete curing blanket 10.

Figure 3:
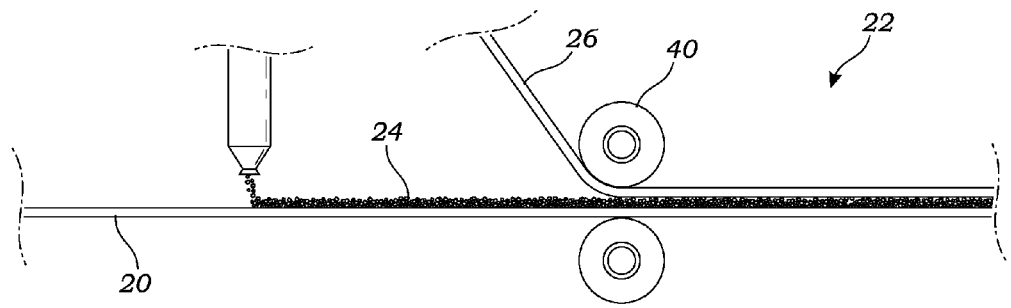
FIG. 3 is a side elevational view of a first step of manufacture of the concrete curing blanket, wherein a wicking layer and a tissue layer are laminated together to contain the super absorbent polymers therebetween, and thereby form an absorbent sheet.

FIG. 3 is a side elevational view of a first step of manufacture of the concrete curing blanket 10, wherein the wicking layer 24 and the tissue layer 26 are laminated together to contain the super absorbent polymers therebetween, and thereby form the absorbent sheet 22. In this embodiment, the super absorbent materials 24 further include a heat activated bonding agent, which facilitates the lamination of the three sheets together in the presence of heat and pressure. In this embodiment, the wicking layer 24, the super absorbent materials 24, and the tissue layer 26 are all laminated together under heat and pressure, such as via one or more rollers 40. Either the rollers 40 themselves may be heated, or a separate heater (not shown) may be included to apply suitable heat to the substrate moving through the rollers 40.

While the present embodiment uses heat, other forms of bonding agents (e.g., contact cement, hot melt adhesive, etc.) may be used during rolling of the substrate, and may include rollers 40 that are not heated, or may omit the rollers entirely, so that the different layers are assembled in another manner known in the art.

Figure 4:
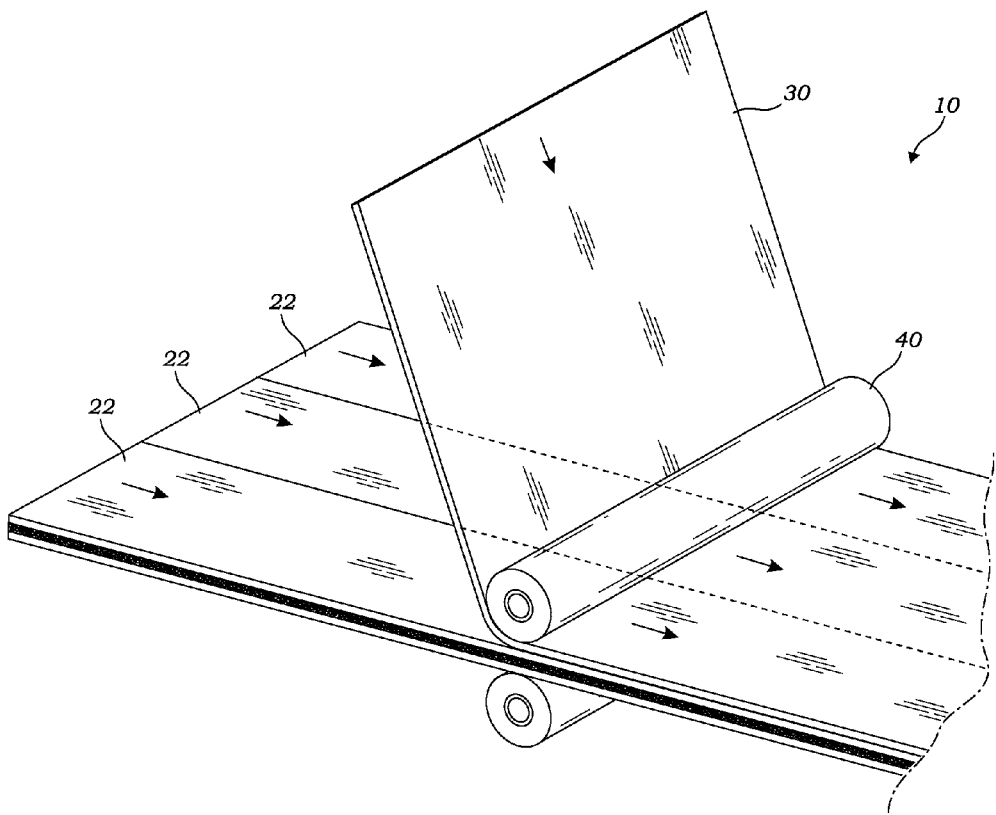
FIG. 4 is a perspective view of a second step of manufacture of the concrete curing blanket, wherein the absorbent sheet formed in FIG. 3 is bonded to a vapor barrier to form the concrete curing blanket of FIGS. 1 and 2.

FIG. 4 is a perspective view of a second step of manufacture of the concrete curing blanket 10, wherein the absorbent sheet 22 formed in FIG. 3 is bonded to a vapor barrier 30 to form the concrete curing blanket 10 of FIGS. 1 and 2. In this embodiment, three of the absorbent sheets 22 are arranged side-by-side (or slightly overlapping) to be bonded to the vapor barrier 30, in this case also using rollers 40, although this is not necessarily required, as discussed above. As described above, heat, a heat activated bonding agent, contact cement, or other suitable adhesive or bonding element may be used to bond these two elements together to form the final concrete curing blanket 10.

In use, the wicking layer 24 picks up water from the concrete slab C, as shown in FIG. 1, and from the wicking layer 24 the water is picked up (more slowly) by the super absorbent materials 24. While the wicking layer 24 can pick up the water quickly, it cannot store as much water, and while the super absorbent materials 24 take longer to absorb the water, they can in the end act as a reservoir for much larger amounts of water.

Following installation, if the wicking layer 24 dries, water wicks from the super absorbent materials 24 back into the wicking layer 24, to maintain the proper hydration of the wicking layer 24 and the concrete slab C.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A concrete curing blanket comprising:
   an absorbent sheet comprising a wicking layer and a tissue layer with super absorbent materials positioned between the wicking layer and the tissue layer;
   wherein the wicking layer and the tissue layer are laminated together with a heat activated bonding agent in the presence of heat and pressure to contain the super absorbent materials between the wicking layer and the tissue layer, such that the wicking layer draws water up into the super absorbent material of the absorbent sheet;
   wherein the wicking layer comprises lycocell, and wherein the super absorbent material comprises sodium polyacrylate;
   a vapor barrier bonded to the tissue layer of the absorbent sheet; and
   wherein the concrete curing blanket is at least 1 meter wide and 5 meters long.

2. A concrete curing blanket comprising:
   an absorbent sheet comprising a wicking layer and a tissue layer with super absorbent materials positioned between the wicking layer and the tissue layer;
   wherein the wicking layer and the tissue layer are laminated together with a heat activated bonding agent in the presence of heat and pressure to contain the super absorbent materials between the wicking layer and the tissue layer, such that the wicking layer draws water up into the super absorbent material of the absorbent sheet;
   wherein the wicking layer comprises lycocell, and wherein the super absorbent material comprises sodium polyacrylate; and
   a vapor barrier bonded to the tissue layer of the absorbent sheet, the vapor barrier having a plurality of perforations.

3. A concrete curing blanket comprising:
   an absorbent sheet consisting of a wicking layer of lycocell and a tissue layer with superabsorbent materials positioned between the wicking layer of lycocell and the tissue layer, the layer of lycocell being laminated to the tissue layer with a heat activated bonding agent in the presence of heat and pressure, such that the wicking layer of lycocell draws water up into the super absorbent material of the absorbent sheet; and
   a vapor barrier bonded to the tissue layer of the absorbent sheet.

4. The concrete curing blanket of claim 3, wherein the super absorbent materials comprise sodium polyacrylate.

5. The concrete curing blanket of claim 3, wherein the concrete curing blanket is at least 1 meter wide and 5 meters long.

6. The concrete curing blanket of claim 3, wherein the vapor barrier has a plurality of perforations.

* * * * *

UNITED STATES PATENT AND TRADEMARK OFFICE
CERTIFICATE OF CORRECTION

PATENT NO. : 9,739,068 B2
APPLICATION NO. : 14/709747
DATED : August 22, 2017
INVENTOR(S) : Randall C. Richards and Gary M. Crowel It is certified that error appears in the above-identified patent and that said Letters Patent is hereby corrected as shown below:

In the Specification

Column 1, Line 17, delete ", and having a".

Column 3, Lines 29, 33, 41, 43, and 48, and Column 4, Lines 41, 47, and Column 5, Lines 5, 7, 8, 13, and 16, the number 20 should appear after "wicking layer," not 24.

In the Claims

Column 5, Line 38, and Column 6, Lines 24-26 and 29, "lycocell" should be replaced with "lyocell.".

Signed and Sealed this
Thirteenth Day of November, 2018

Andrei Iancu
*Director of the United States Patent and Trademark Office*